US012465549B2

(12) United States Patent
Liu

(10) Patent No.: US 12,465,549 B2
(45) Date of Patent: Nov. 11, 2025

(54) SEXUAL STIMULATION DEVICE

(71) Applicants: HYTTO PTE. LTD, Singapore (SG); DONGGUAN AISI HEALTH CARE PRODUCTS CO., LTD., Dongguan (CN)

(72) Inventor: Dan Liu, Guangdong (CN)

(73) Assignees: HYTTO PTE. LTD., Singapore (SG); DONGGUAN AISI HEALTH CARE PRODUCTS CO., LTD., Dongguan (CN)

( * ) Notice: Subject to any disclaimer, the term of this patent is extended or adjusted under 35 U.S.C. 154(b) by 0 days.

(21) Appl. No.: 18/384,295

(22) Filed: Oct. 26, 2023

(65) Prior Publication Data

US 2025/0134758 A1 May 1, 2025

Related U.S. Application Data

(63) Continuation-in-part of application No. 29/804,118, filed on Aug. 18, 2021, now Pat. No. Des. 1,004,115.

(51) Int. Cl.
*A61H 19/00* (2006.01)
*A61H 23/00* (2006.01)
*A61H 23/02* (2006.01)

(52) U.S. Cl.
CPC ........... *A61H 19/32* (2013.01); *A61H 23/006* (2013.01); *A61H 23/0254* (2013.01); *A61H 2201/1215* (2013.01); *A61H 2201/149* (2013.01); *A61H 2201/165* (2013.01); *A61H 2201/1664* (2013.01); *A61H 2201/5025* (2013.01)

(58) Field of Classification Search
CPC .. A61H 19/32; A61H 23/006; A61H 23/0254; A61H 2201/149; A61H 2201/1664; A61H 2201/5025; A61H 19/00; A61H 11/00
See application file for complete search history.

(56) References Cited

U.S. PATENT DOCUMENTS 3,955,563 A * 5/1976 Maione ................ A61H 31/006 601/106
D898,214 S * 10/2020 Zhou ............................ D24/215
(Continued)

FOREIGN PATENT DOCUMENTS

CN 116650299 A * 8/2023

OTHER PUBLICATIONS

English translation for CN 116650299, machine translated by Espacenet.com, translated on Dec. 20, 2023.*
(Continued)

*Primary Examiner* — Tu A Vo
(74) *Attorney, Agent, or Firm* — Holtz, Holtz & Volek PC

(57) ABSTRACT

A device for providing sexual stimulation to an anatomically male user includes a main body including a stimulating portion, an encirclement portion, and a drive unit. The encirclement portion extends from at least one side of the main body, and defines a cylindrical hollow region which at least partially encircles a body part of a user that is received in the encirclement portion. The drive unit is disposed in the main body and is configured to drive the stimulating portion to apply a reciprocating stimulation, including a tapping stimulation, to at least a portion of the body part of the user that is received in the encirclement portion.

17 Claims, 11 Drawing Sheets

(56) References Cited

U.S. PATENT DOCUMENTS

| | | | | |
|---|---|---|---|---|
| 11,090,221 | B1 * | 8/2021 | Haddock DiCarlo | A61H 23/0254 |
| D983,394 | S * | 4/2023 | Zhang | D24/215 |
| 11,664,699 | B1 * | 5/2023 | Leng | H02K 16/00 310/75 R |
| 2007/0179414 | A1 * | 8/2007 | Imboden | A61H 19/00 601/72 |
| 2008/0071202 | A1 * | 3/2008 | Nardi | A61H 11/00 601/97 |
| 2009/0306468 | A1 * | 12/2009 | Tasker | A61H 19/34 600/41 |
| 2011/0166415 | A1 * | 7/2011 | Zamar | A61H 23/00 600/38 |
| 2013/0030245 | A1 * | 1/2013 | Lewis | A61H 23/0254 600/38 |
| 2013/0041211 | A1 * | 2/2013 | Zamar | A61H 19/30 600/38 |
| 2013/0172669 | A1 * | 7/2013 | Lewis | A61H 19/32 600/38 |
| 2016/0324718 | A1 * | 11/2016 | Zamar | A61H 19/40 |
| 2019/0183723 | A1 * | 6/2019 | Swenson | A61H 15/00 |
| 2019/0247271 | A1 * | 8/2019 | Lee | A61H 23/006 |
| 2019/0254923 | A1 * | 8/2019 | Brouse | A61H 1/00 |
| 2019/0365598 | A1 * | 12/2019 | Qu | A61H 15/0085 |
| 2020/0237609 | A1 * | 7/2020 | Kirsten | A61H 19/30 |
| 2020/0289364 | A1 * | 9/2020 | Zhou | A61H 23/0263 |
| 2020/0352821 | A1 * | 11/2020 | Wersland | A61H 23/006 |
| 2021/0196562 | A1 * | 7/2021 | Zhao | A61H 23/0254 |
| 2021/0322202 | A1 * | 10/2021 | Xu | A61F 5/41 |
| 2021/0361524 | A1 * | 11/2021 | Marton | A61H 23/006 |
| 2021/0393475 | A1 * | 12/2021 | He | A61H 19/34 |
| 2022/0331142 | A1 * | 10/2022 | Paz | A61N 7/00 |
| 2023/0149257 | A1 * | 5/2023 | Lee | B60N 2/995 601/98 |
| 2024/0122797 | A1 * | 4/2024 | Moaddeb | A61N 1/36031 |

OTHER PUBLICATIONS

Amazon-Ultibela ("Tapping Male Masturbator, Hands-Free Penis Vibrator with Adjustable Buckle & 7 Training Modes, Rechargeable Portable Male Vibrator Adult Sex Toys for Men Masturbation & Games Prolong Endurance"), available on Apr. 21, 2023.*

Amazon-Ultibela ("Tapping Male Masturbator, Hands-Free Penis Vibrator with Adjustable Buckle & 7 Training Modes, Rechargeable Portable Male Vibrator Adult Sex Toys for Men Masturbation & Games Prolong Endurance"), Available on Jul. 20, 2022 and is captured on Jan. 2, 2023.*

Baiwatt, Amazon.com, "Male Sex Toys for Men-Male Masturbator Penis Training Vibrator with APP control, Vibrating Sex Toy Strokers Glands Trainer Stimulator, Mens Sex Machine Masturbators Adult Sex Toys & Games", available date Jun. 1, 2022, earliest captured date Aug. 7, 2022 (see review by Jacki, p. 22/22).*

* cited by examiner

SEXUAL STIMULATION DEVICE

CROSS-REFERENCE TO RELATED APPLICATIONS

This application is a Continuation-in-Part Application of U.S. application Ser. No. 29/804,118, filed Aug. 18, 2021, and issued as U.S. Patent No. D1,004,115 on Nov. 7, 2023, the entire contents of which are incorporated herein by reference.

FIELD

The present invention relates to a device for providing sexual stimulation to an anatomically male user.

BACKGROUND

Existing sexual stimulation devices for use by an anatomically male user predominantly rely on simulating vaginal pressure on the penis and/or providing friction through internal textures to achieve sexual stimulation. Alternatively, or additionally, such a device may include a rod adapted for anal insertion to vibrate or apply pressure to the user's prostate.

SUMMARY

According to an embodiment, a sexual stimulation device is provided which can provide different types of sexual stimulation to an anatomically male user.

In an embodiment, the device includes a main body portion which is configured to receive and at least partially encircle a penis of a user, and a drive unit and a stimulating portion which are configured to apply different types of stimulation (e.g., tapping, vibration) to specific portions of the penis for the purpose of sexual gratification.

Additional features and advantages of the invention will become apparent from the following detailed description and appended claims.

BRIEF DESCRIPTION OF THE DRAWINGS

In the following detailed description reference is made to the accompanying drawings, in which.

DETAILED DESCRIPTION

Figure 1:
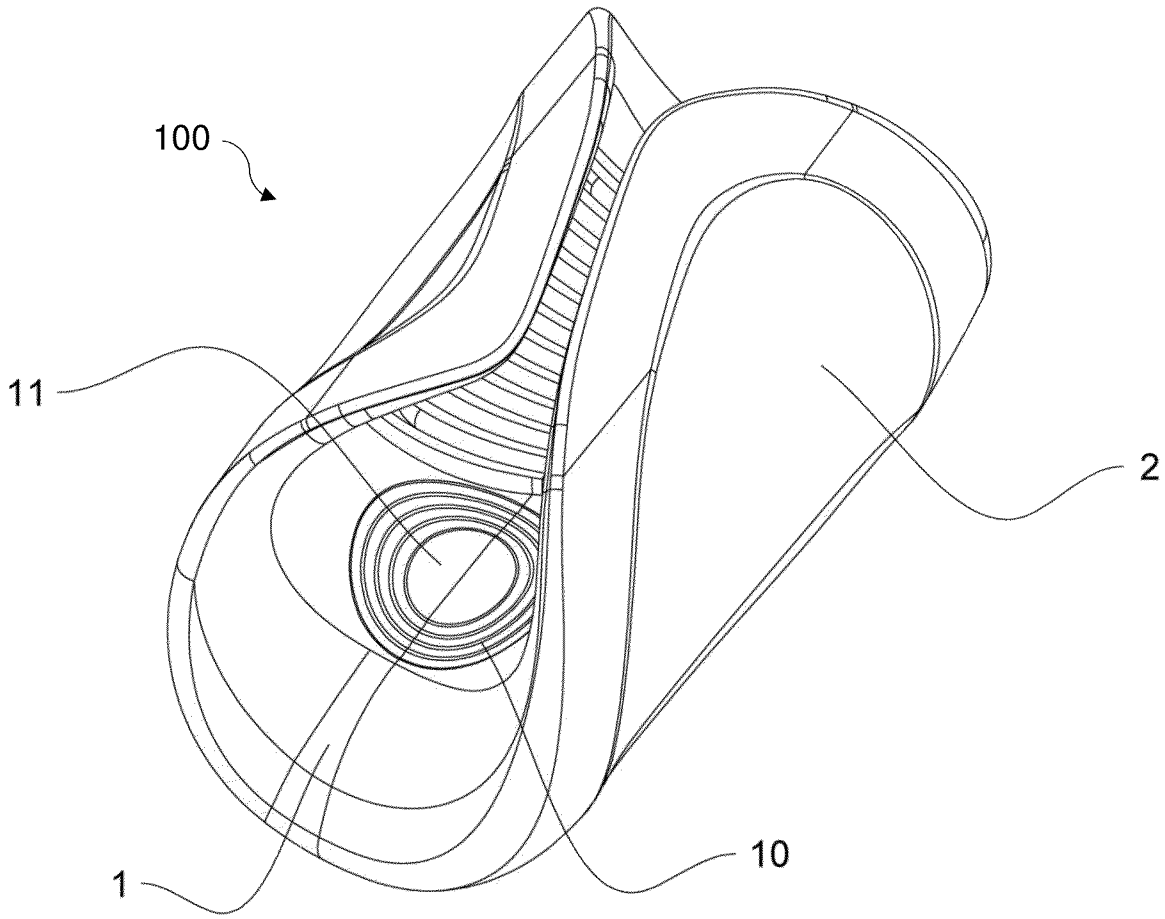
FIG. 1 is a front perspective view of a sexual stimulation device according to an embodiment.

Hereinafter, embodiments of the present invention are described with reference to the drawings, in which same reference numerals are given to same or corresponding portions, and redundant explanation thereof is omitted. It is noted that while the drawings illustrate exemplary embodiments, various modifications within the spirit and scope of the instant disclosure will be apparent to those of ordinary skill in the art.

FIGS. 1-4 are perspective views showing an exemplary configuration of a sexual stimulation device 100 according to an embodiment.

Figure 2:
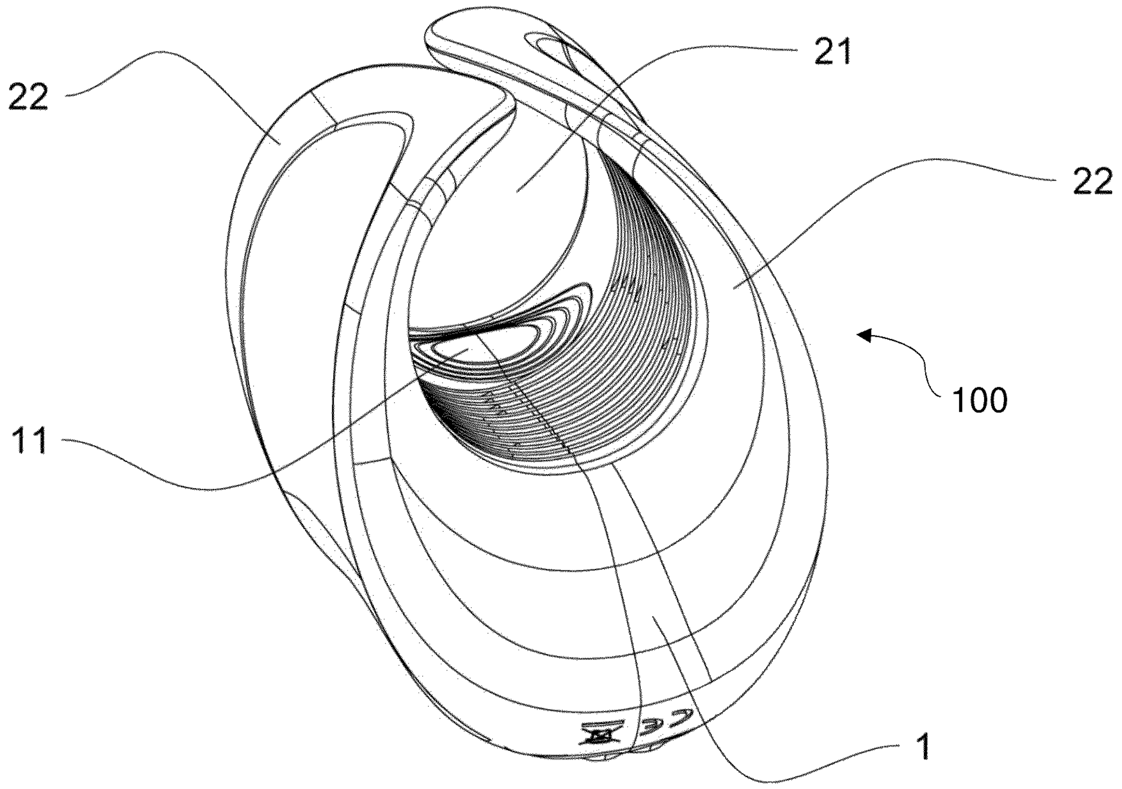
FIG. 2 is a rear perspective view of the device.
Figure 3:
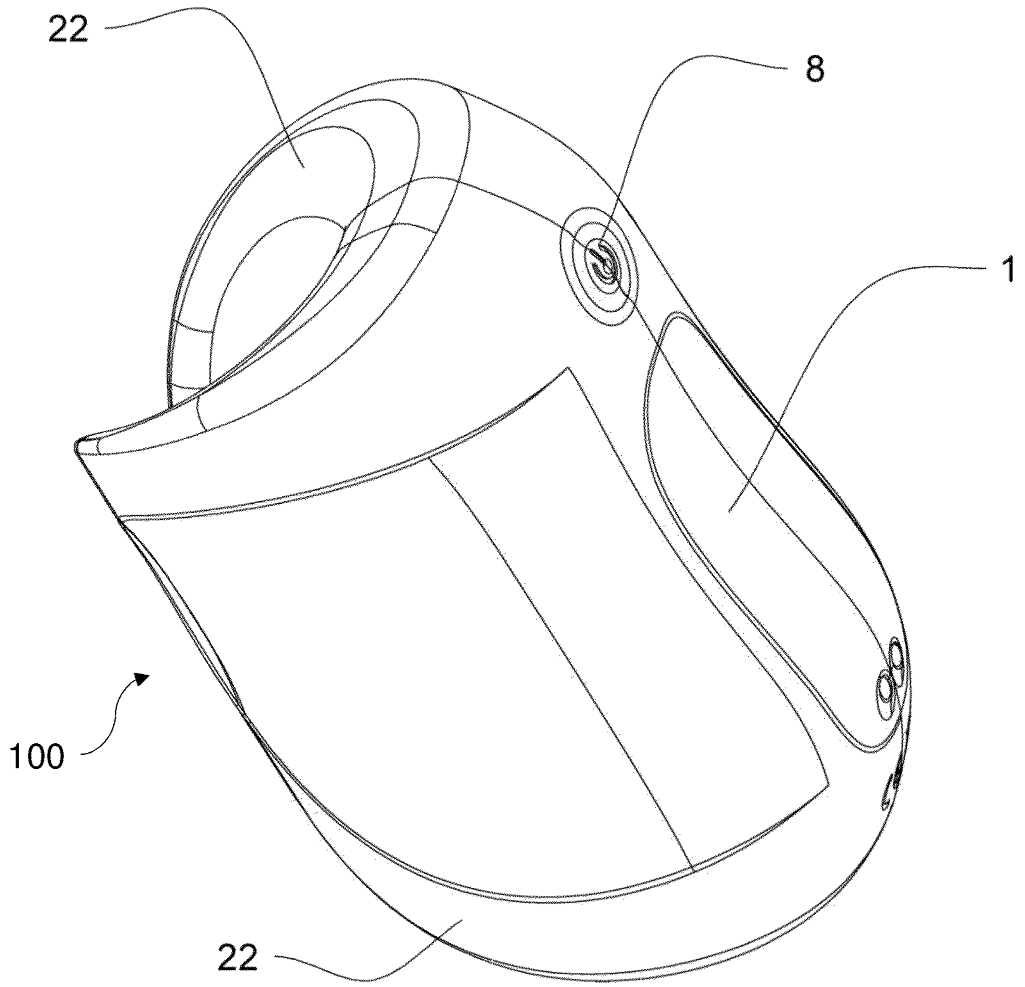
FIG. 3 is a bottom perspective view of the device.

As shown in FIGS. 1-4, the sexual stimulation device 100 comprises a main body 1 which includes a stimulating portion 10 and an encirclement portion 2. The encirclement portion 2 extends from at least one side of the main body 1. As shown in FIG. 2, the encirclement portion 2 defines a cylindrical hollow region 21 that can partially or fully surround a specific area of the user's body, such as the user's penis, when the specific area is inserted into the encirclement portion 2.

Figure 5:
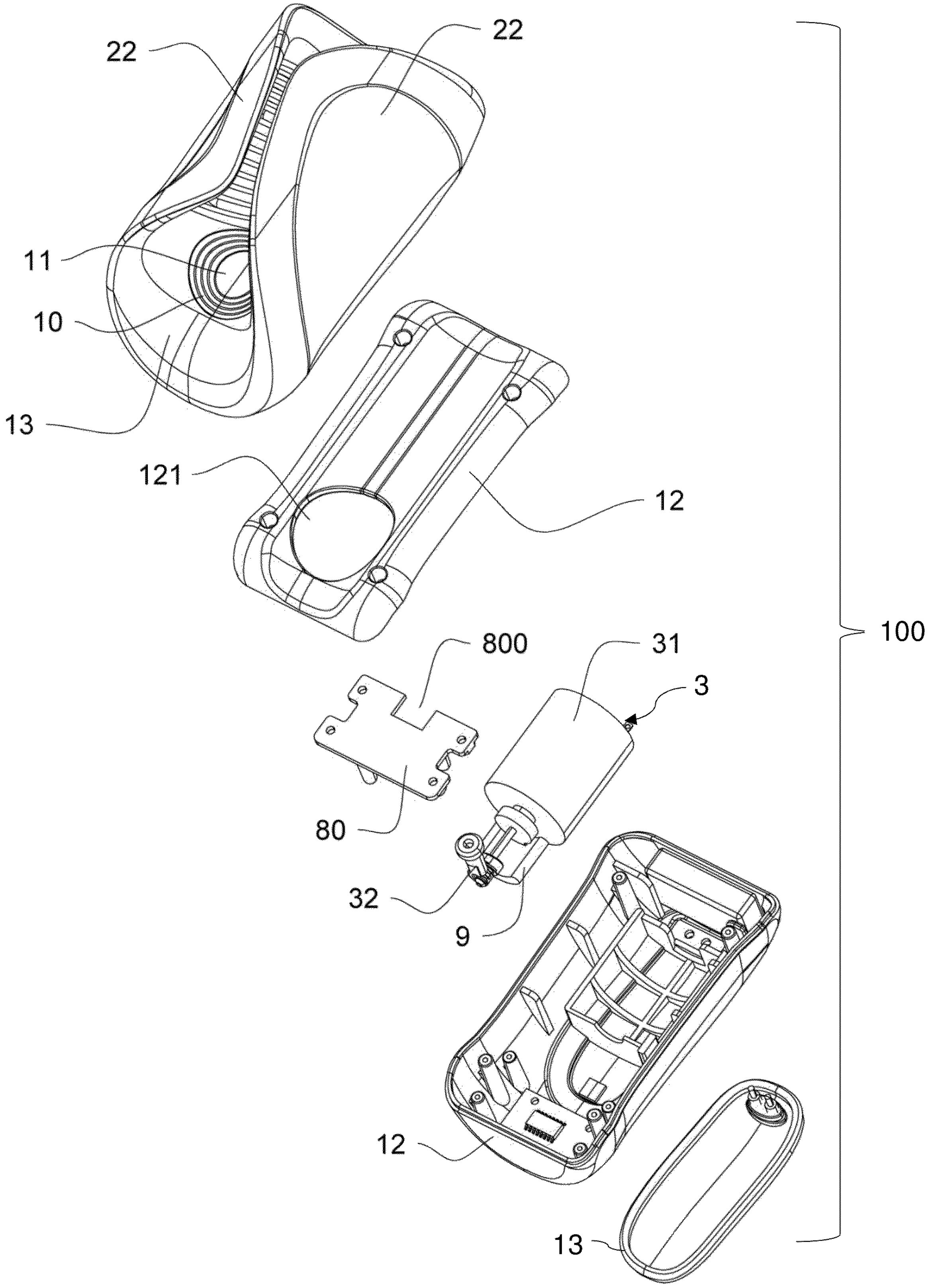
FIG. 5 is a top exploded view of the device.
Figure 6:
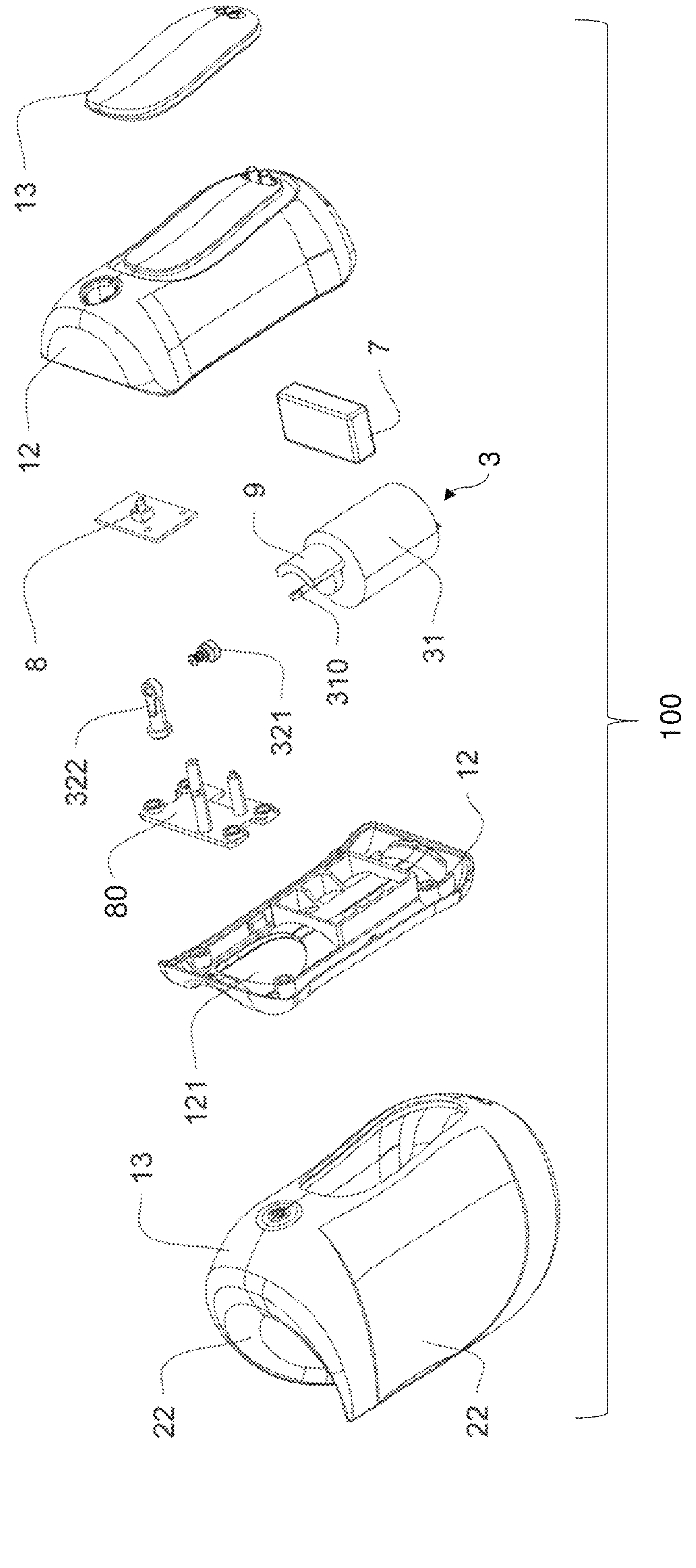
FIG. 6 is a bottom exploded view of the device.

As shown in FIGS. 5 and 6, for example, the main body 1 also houses a drive unit 3. The drive unit 3 is responsible for propelling the stimulating portion 10 in a reciprocating motion. This reciprocating motion stimulates at least one portion of the specific area of the user's body (e.g., the penis), whereby a tapping stimulation feature can be achieved.

In particular, as shown in FIGS. 1, 2, and 5, for example, the stimulating portion 10 includes a stimulating point 11, and the drive unit 3 is configured to drive the stimulating point 11 to repeatedly project outward from the surface of the stimulating portion 10. In this way, the sexual stimulation device 100 is capable of delivering a tapping stimulation to at least a portion of the penis (e.g., an area near the glans, penile frenulum, etc.) when the penis is inserted in the encirclement portion 2. The stimulating point 11 can be configured to be substantially level with the surface of the stimulating portion 10 when the stimulating point 11 is located at its original position.

As shown in FIGS. 4B-6, the main body 1 comprises a housing 12 and a flexible surface 13 (flexible layer). The stimulating portion 10 can be situated on the flexible surface 13, or can be integrally provided with the flexible surface 13. The housing 12 has an opening 121. The drive unit 3 comprises a motor 31, which is mounted inside the housing 12, and a reciprocating mechanism 32 equipped with a power take-off unit. The power take-off unit moves in a reciprocating manner as the motor 31 rotates, resulting in pulsation of the stimulating point 11 of the stimulating portion 10. This isolated pulsation is designed to stimulate the penis of the user, as discussed above.

As shown in FIG. 4B-6, the reciprocating mechanism 32 employed can be a crank linkage mechanism, and may include a crank member 321 coupled with an output shaft 310 of the motor 31 and a connecting rod member 322 serving as the above-described power take-off unit. The distal end of the connecting rod member 322 passes through the opening 121 to connect with the stimulating point 11.

Figure 4A:
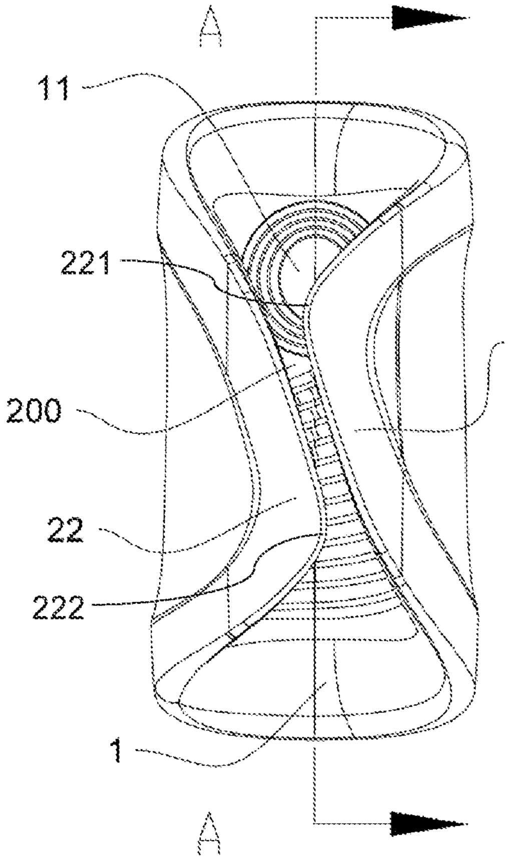
FIG. 4A is a plan view of the device.
Figure 4B:
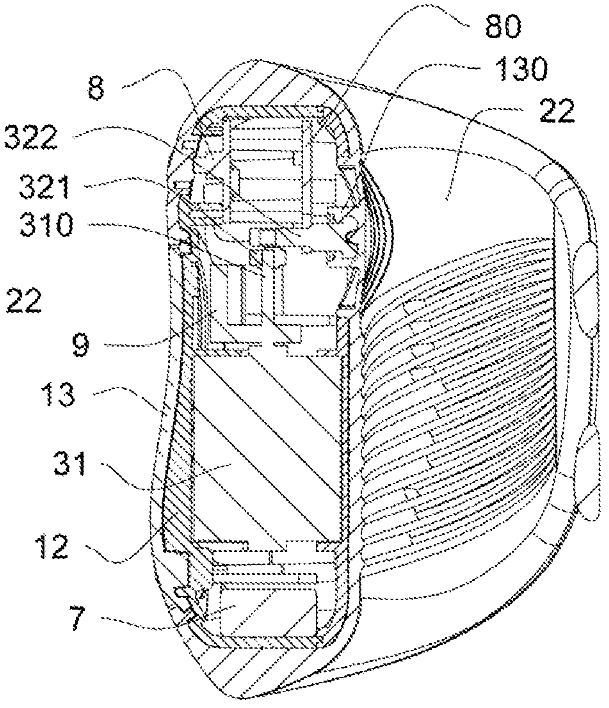
FIG. 4B is a sectional view of the device taken along line A-A of FIG. 4A.

Additionally, as shown in FIGS. 4B and 6, the sexual stimulation device 100 includes a battery 7 that electrically connects to the motor 31. A control button 8 is positioned at a bottom of a distal end of the main body 1, electrically connected to the battery 7. The control button 8 can be designed to activate the motor 31 when pressed, thereby causing a change in its movement.

To prevent excessive lateral oscillation of the connecting rod member 322, the sexual stimulation device 100 may also incorporate a lateral limiting member 80, as shown in FIGS. 4B and 5. The lateral limiting member 80 can be securely housed below the opening 121 and configured to restrict lateral movement of the connecting rod member 322.

As shown in FIGS. 4B-6, moreover, the drive unit 3 may also incorporate a vibrating wheel 9 operably coupled with the output shaft 310 of the motor 31. The vibrating wheel 9 is adapted to generate vibrations, which enables the device to provide another type of stimulation to the user's penis in addition to the tapping stimulation provided by the stimulating point 11.

As shown in FIGS. 2-6, the encirclement portion 2 comprises at least one curved and resilient wing portion 22, which is securely attached to/extends from at least one side of the main body 1. In an embodiment, the flexible surface 13 and the wing portions 22 are constructed of silicone material. The distal end of the connecting rod member 322 can be coupled to the stimulating point 11 of the flexible surface 13 via a silicone embedded connector 130 (see FIG. 4B). Notably, with this configuration, the flexible surface 13 can be seamlessly molded together with the wing portions 22, forming an integral structure. While silicone material has been described as an exemplary material for the flexible surface 13 and the wing portions 22, other appropriate materials which are able to provide different types of sensations to the user (e.g., materials having a rough or soft texture) are also envisaged. Such materials can be also be combined.

In an embodiment, as shown in FIGS. 2-4A, the encirclement portion 2 includes a pair of wing portions 22, with one wing portion 22 located on each side of the housing 12. As shown in FIG. 4A, a gap 200 can be intentionally left between the distal ends of the two wing portions 22. During usage, as the wing portions 22 encircle the user's penis, the wing portions 22 undergo deformation, causing the spacing of the gap 200 to widen. This deformation facilitates a comfortable and snug fit and accommodates the shape of the user's penis. Furthermore, the gap 200 may be configured so that the gap 200 is non-collinear with a central axis of the cylindrical hollow region 21 along an extension direction of the gap 200. FIG. 4A shows an example of such a configuration, in which the gap 200 has a curved shape (e.g., an S-like shape) along its length when viewed in plan view. With this configuration, the sexual stimulation device 100 defines first and second primary force-bearing portions 221 and 222, which are distributed on respective opposite sides of the central axis of the cylindrical hollow region 21 when the device is worn on the user's penis. This configuration significantly reduces the likelihood of the sexual stimulation device 100 unintentionally detaching or falling off during use.

Figure 7:
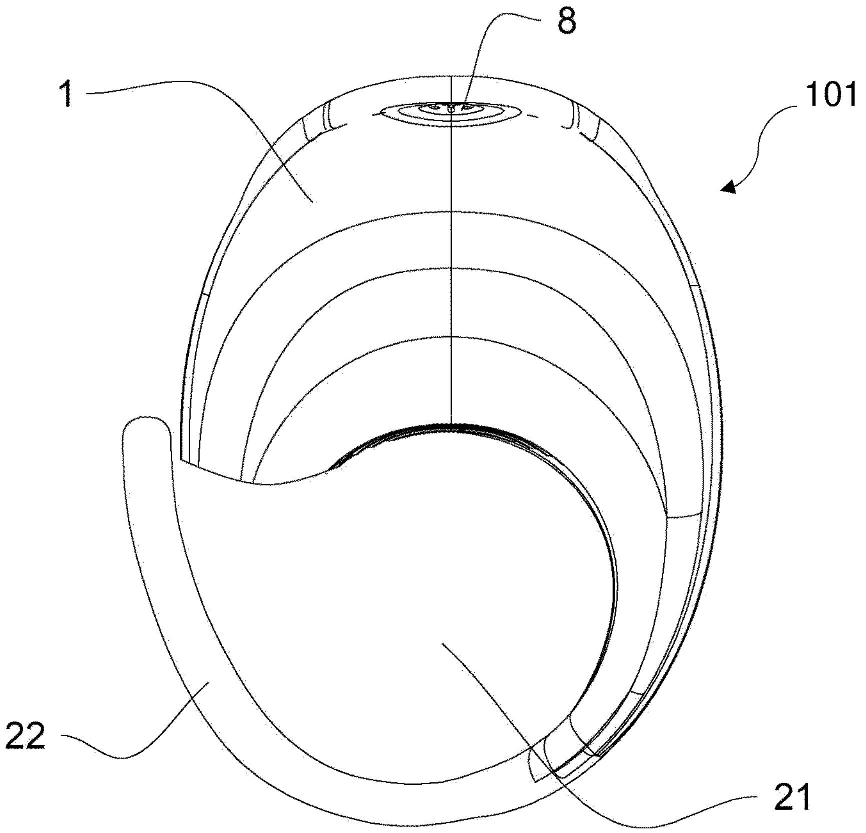
FIG. 7 is a rear elevation view of the device according to an embodiment.

In the embodiment of FIGS. 1-6 described above, the encirclement portion 2 extends from both sides of the main body 1; however, it is also possible for the encirclement portion 2 to extend from only one side of the main body 1, as long as the encirclement portion 2 is able to define the cylindrical hollow region 21 around at least a portion of a circumference of the specific area. FIG. 7 illustrates an exemplary configuration of a sexual stimulation device 101 according to such an embodiment.

Figure 8A:
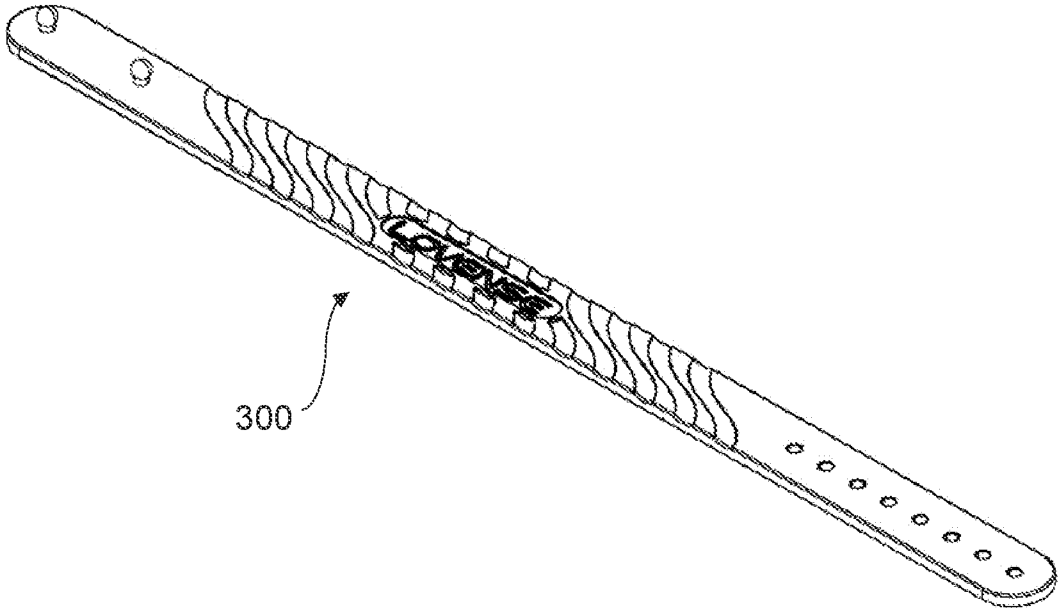
FIG. 8A is a perspective view of a strap adapted for use with the device according to an embodiment, in an unengaged state.
Figure 8B:
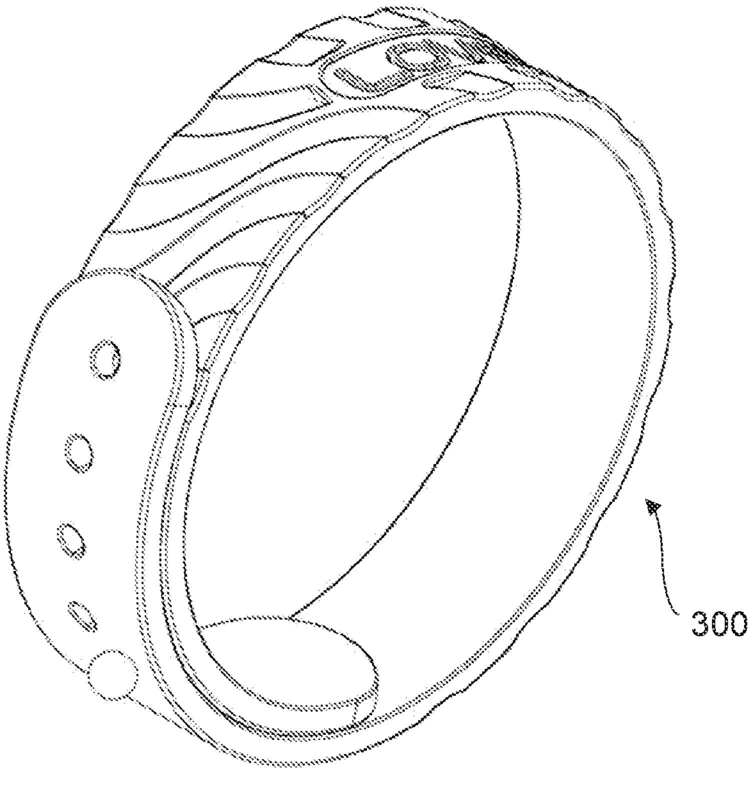
FIG. 8B is a perspective view of the strap in an engaged state.

To further enhance the functionality of the sexual stimulation device 100, a user may employ a strap 300. An exemplary configuration of the strap 300 is shown in FIGS. 8A and 8B, which illustrate the strap 300 in an unengaged state and an engaged state, respectively. The strap 300 may be provided as a component of the sexual stimulation device 100 (i.e., be integrated with the sexual stimulation device 100), or may be separately provided and adapted for use with the sexual stimulation device 100. The strap 300 can be employed by wrapping the strap 300 around an outer circumference of the main body 1 and wing portions 22. By securing the strap 300 (e.g., by a knot, buckle, press-through fastener, hook-and-loop fastener, etc.), the cylindrical hollow region 21 formed by the encirclement portion 2 can be narrowed as desired by the user, offering a more customized and snug experience.

Figure 9:
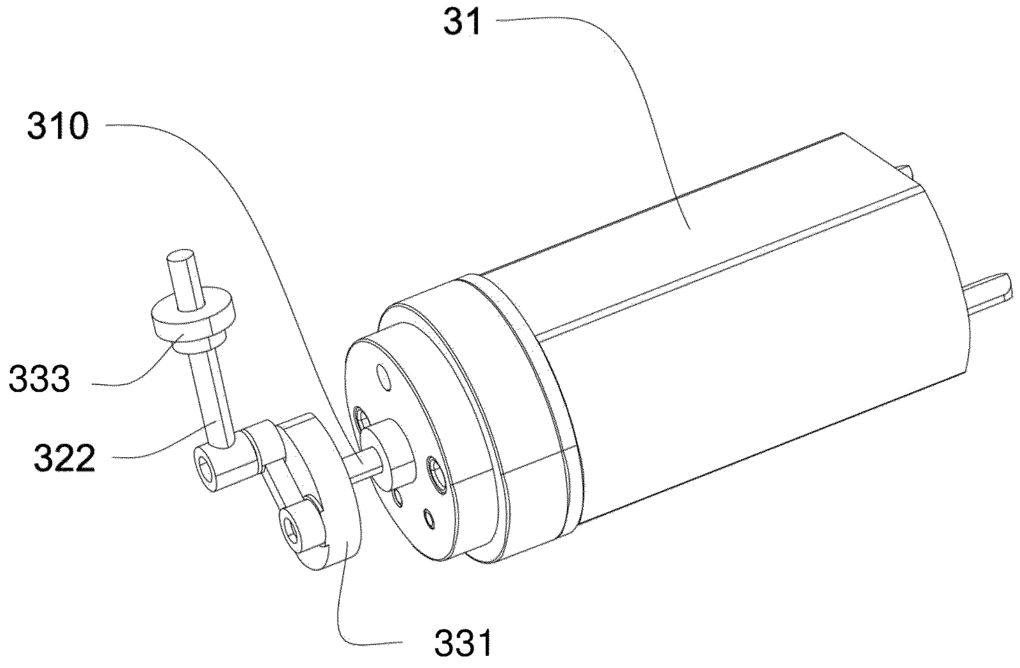
FIG. 9 is a perspective view of a drive unit according to an embodiment.

FIG. 9 illustrates a modification of a drive unit 30 according to an embodiment. As shown in FIG. 9, the drive unit 30 includes a motor 31 and an output shaft 310, in a manner similar to the drive unit 3 described above. The drive unit 30 further includes an eccentric wheel 331 including an eccentric shaft operably coupled to the output shaft 310 of the motor 31, and a connecting rod member 332 coupled to the eccentric wheel 331. The connecting rod member 332 moves within a linear guiding tube 333 which is secured to the housing 12 below the opening 121. That is, the linear guiding tube 333 serves to encase and guide motion of the connecting rod member 332. In this modification, the linear guiding tube 333 is provided as a replacement for the above-described lateral limiting member 80, and serves a similar function (i.e., to restrict lateral movement of the connecting rod member 332). With this modification, the distal end of the connecting rod 332 can be allowed to be left unconnected to the flexible surface 13, while maintaining the ability of the distal end of the connecting rod 332 to repeatedly strike the stimulating point 11 on the flexible surface 13 to achieve penile tapping. Further, the driving of the eccentric wheel 331 causes generation of vibrations, which can provide further stimulation to the user's penis. This configuration can be used instead of (or in addition to) the above-described vibrating wheel 9 to achieve vibration.

Figure 10:
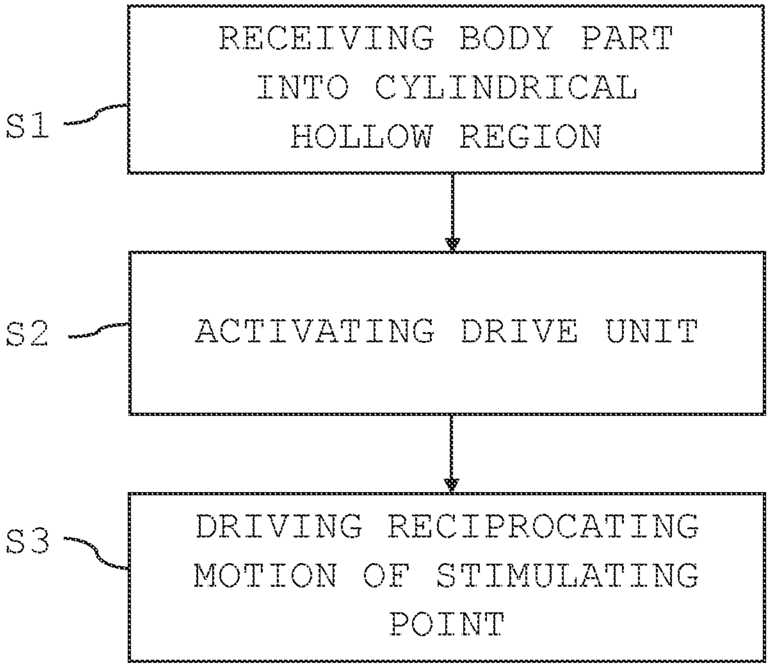
FIG. 10 is a flowchart illustrating an exemplary method according to an embodiment.

FIG. 10 illustrates a flowchart of a method using the sexual stimulation device 100 according to an embodiment. In step S1, a user's penis is inserted into the cylindrical hollow region 21 defined by the encircling portion 2. In step S2, the drive unit 3 is activated (e.g., by operation of the control button 8). Operating the control button 8 may control on/off of the drive unit 3, and may also be operated to switch among various intensity levels. In step S3, the drive unit 3 propels the stimulating point 11 to repeatedly project from the surface of the stimulation portion 10. This results in stimulation being applied to at least the portion of the user's penis with which the stimulating point 11 contacts.

Figure 11:
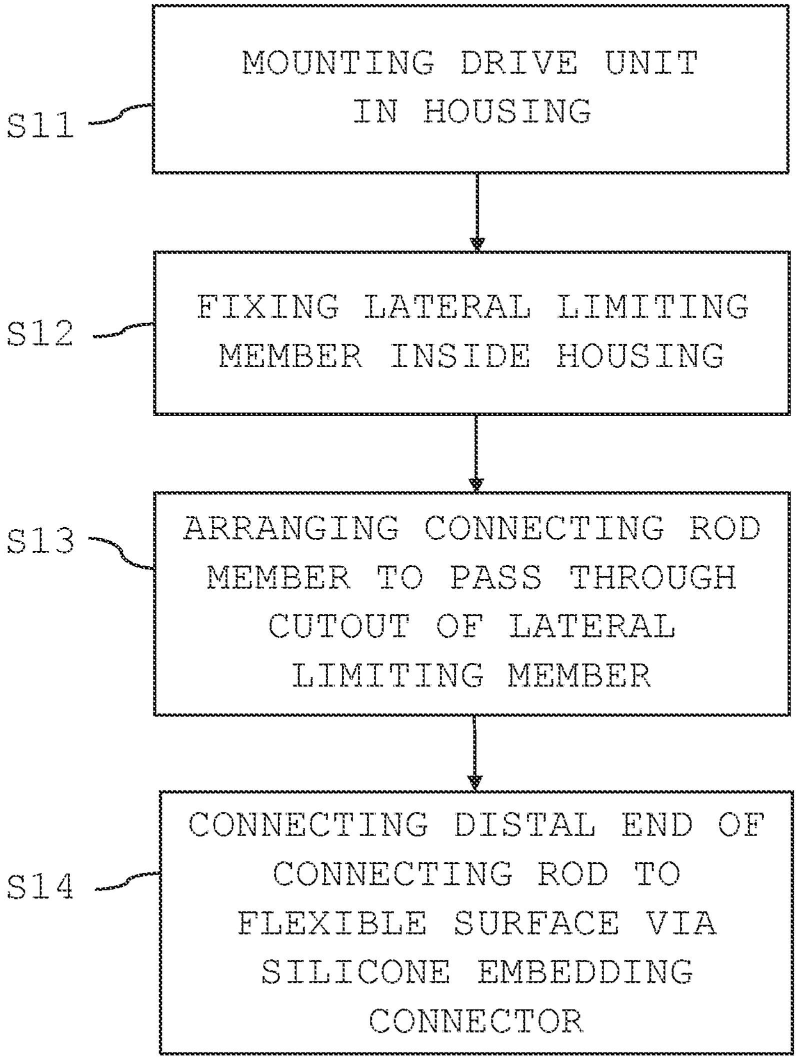
FIG. 11 is a flowchart illustrating an exemplary assembly method of the device.

FIG. 11 illustrates a flowchart of a method for assembling the stimulating portion 10 of the sexual stimulation device 100. In step S11, the drive unit 3 is mounted within the housing 12. In step S12, the lateral limiting member 80, which is equipped with a cutout 800, is fixed inside the housing 12. In step S13, the connecting rod member 322 of the crank linkage mechanism is arranged to cause it to pass through the cutout 800 and contact with an edge of the cutout 800, allowing subsequent assembly of flexible surface 13 over the connecting rod member 322. In step S14, the distal end of the connecting rod member 322 is caused to be embedded within the flexible surface 13 of the stimulating portion 10 by way of the silicone embedding connector 130. Notably, the silicone embedding connector 130 can be directly aligned with the stimulating point 11 of the stimulating portion 10.

It will be apparent to those skilled in the art that various modifications and variations can be made to the device and method described herein. It should be understood that the drawings and detailed description thereof are not intended to limit the invention to a particular disclosed form, and that additional embodiments will be apparent to those skilled in the art from consideration and/or practice of the instant disclosure. It is intended that the specification, drawings, and examples provided herein be considered as exemplary, with the true scope of the invention, including modifications, equivalents, and alternatives falling within the spirit and scope thereof, being described by the appended claims.

What is claimed is:

1. A sexual stimulation device comprising:

a main body comprising:

a housing, a length of the housing being wider than a width of the housing, the length of the housing extending along a length of the main body, and the housing having an opening formed therein; and a flexible layer encasing the housing therein, the flexible layer comprising a stimulating portion, the stimulating portion including a stimulating point, the stimulating point forming a central portion of the stimulating portion, and the simulating point and the stimulating portion being positioned along the length of the main body such that the stimulating point and the stimulating portion are closer to a front end of the main body than a rear end of the main body;

a pair of curved wing portions formed by the flexible layer and extending from opposite sides of the main body, the wing portions defining a cylindrical hollow region, distal ends of the wing portions opposing each other across a gap, the gap being non-collinear with a center axis of the cylindrical hollow region and defining, along with the distal ends of the wing portions, at least one primary force-bearing portion provided on each of respective opposite sides of the center axis of the cylindrical hollow region, the wing portions being configured to contact with and at least partially encircle a penis of a user that is received in the cylindrical hollow region, and the wing portions being configured such that a spacing of the gap is widened due to deformation of the wing portions that occurs as the wing portions surround and contact with the penis of the user when the penis of the user is received in the cylindrical hollow region;

a driver disposed in the housing, the driver being configured to drive the stimulating point in a reciprocating manner to provide a tapping stimulation by repeatedly projecting outward from a surface of the flexible layer along a first direction that is perpendicular to a length direction of the main body, and the driver comprising:

a motor including an output shaft; and a reciprocating mechanism, the reciprocating mechanism comprising a connecting rod and an eccentric wheel coupled with the output shaft of the motor, a distal end of the connecting rod being configured to extend through the opening and being in contact with an inner surface of the flexible layer that is underneath the stimulating point, the stimulating point being substantially level with a surface of the stimulation portion directly surrounding the stimulating point when the stimulating point is in a middle position, the driver being configured to drive the stimulating point to be above the surface of the stimulation portion directly surrounding the stimulating point and to drive the stimulating point to be below the surface of the stimulation portion directly surrounding the stimulating point, and the stimulating point forming a lowest point within the cylindrical hollow region when the stimulating point is driven to be below the surface directly surrounding the stimulating point in a state in which the device is oriented in a horizontal orientation; and a button arranged on the main body, the main body being disposed between the button and the cylindrical hollow region, wherein:

the wing portions are configured such that at least a part of an edge of each wing portion substantially fits with a corona of the penis of the user in a state in which the penis of the user is received in the cylindrical hollow region at such a position that the tapping stimulation taps a frenulum of the penis of the user, and the wing portions oppose at least a part of the stimulating portion, when the device is viewed in a plan view along the first direction, whereby the sexual stimulation device is wearable on the body part of the user in such a way as to reduce a likelihood of the sexual stimulation device unintentionally detaching or falling off during use.

2. The device according to claim 1, further comprising:

a battery electrically connecting to the motor, wherein the button comprises a control button disposed at a bottom of a distal end of the main body, the control button electrically connecting to the battery, and the control button being configured to activate the motor in response to operation thereof, thereby resulting in a change of a movement of the motor.

3. The device according to claim 1, further comprising a lateral limiting member, the lateral limiting member being secured to the housing below the opening and restricting lateral oscillation of the connecting rod.

4. The device according to claim 3, wherein the lateral limiting member comprises a linear guiding tube configured to encase and guide motion of the connecting rod.

5. The device according to claim 4, wherein the eccentric wheel includes an eccentric shaft operably coupled with the output shaft of the motor and configured to generate vibration during driving of the output shaft.

6. The device according to claim 3, wherein:

the lateral limiting member comprises a partition having a cutout which is substantially perpendicular to an axis of the connecting rod, and an edge of the cutout is configured to surround an intermediate portion of the connecting rod.

7. The device according to claim 1, wherein the drive unit further comprises a vibrating wheel operably coupled with the output shaft of the motor and configured to generate vibrations during driving of the output shaft.

8. The device according to claim 1, wherein:

the flexible layer, the stimulating point, and the wing portions are all made of a silicone material, and the distal end of the connecting rod member is connected to the stimulating point via a silicone embedded connector.

9. The device according to claim 1, wherein the flexible layer is integrally molded with the wing portions.

10. The device according to claim 1, further comprising a strap which wraps around an outer side of the main body and the wing portions and is operable to narrow the cylindrical hollow region.

11. The device according to claim 1, wherein both the flexible layer and the wing portions are made of a silicone material.

12. The device according to claim 11, wherein:

the center axis of the cylindrical hollow region extends along a second direction orthogonal to the first direction, each of the distal ends of the wing portions opposes the center axis of the cylindrical hollow region, as viewed in the plan view along the first direction, and one of the distal ends of the wing portions opposes the stimulating point, as viewed in the plan view along the first direction.

13. The device according to claim 1, wherein:

both the flexible layer and the wing portions are made of a silicone material, and the gap has a curved shape along an extension direction of the gap.

14. The device according to claim 13, wherein:

the center axis of the cylindrical hollow region extends along a second direction orthogonal to the first direction, each of the distal ends of the wing portions opposes the center axis of the cylindrical hollow region, as viewed in the plan view along the first direction, and one of the distal ends of the wing portions opposes the stimulating point, as viewed in the plan view along the first direction.

15. The device according to claim 1, wherein the flexible layer comprises a first portion in which the housing is received, and a second portion provided in the first portion.

16. The device according to claim 15, wherein the stimulating portion and the wing portions are integrally molded with the first portion.

17. The device according to claim 1, wherein the stimulating point and the wing portions are integrally molded with the flexible layer.

* * * * *